(12) United States Patent
Fan

(10) Patent No.: US 11,750,001 B2
(45) Date of Patent: *Sep. 5, 2023

(54) METHOD AND APPARATUS FOR CONTROLLING CHARGE PUMP CHIPS

(71) Applicant: BEIJING XIAOMI MOBILE SOFTWARE CO., LTD., Beijing (CN)

(72) Inventor: Jie Fan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 70 days.

This patent is subject to a terminal disclaimer.

(21) Appl. No.: 16/986,046

(22) Filed: Aug. 5, 2020

(65) Prior Publication Data

US 2021/0288513 A1 Sep. 16, 2021

(30) Foreign Application Priority Data

Mar. 13, 2020 (CN) .......................... 202010177274.3

(51) Int. Cl.
*H02J 7/00* (2006.01)

(52) U.S. Cl.
CPC .... *H02J 7/00309* (2020.01); *H02J 7/007192* (2020.01)

(58) Field of Classification Search
CPC ................................................ H02J 7/007192
USPC ........................................................ 320/153
See application file for complete search history.

(56) References Cited

U.S. PATENT DOCUMENTS

| 10,797,502 | B2* | 10/2020 | Fan | H02J 7/0072 |
| 11,122,708 | B1* | 9/2021 | Fan | H05K 1/0277 |
| 2014/0042984 | A1* | 2/2014 | Yamada | H02J 50/10 |
| | | | | 320/138 |
| 2018/0368074 | A1* | 12/2018 | Gong | H04W 52/0274 |

(Continued)

FOREIGN PATENT DOCUMENTS

| CN | 106169787 | | 11/2016 |
| CN | 109066884 | * | 12/2018 |
| CN | 109066884 A | | 12/2018 |

OTHER PUBLICATIONS

Office Action dated Apr. 20, 2022, in corresponding Chinese Patent Application No. 2020101772746 (with English Translation), 18 pages.

(Continued)

*Primary Examiner* — Yalkew Fantu
(74) *Attorney, Agent, or Firm* — Oblon, McClelland, Maier & Neustadt, L.L.P.

(57) ABSTRACT

A charging control method and apparatus are provided. The electronic device can include a first circuit board, a second circuit board, and a charge pump chipset. The second circuit board is provided on the first circuit board. The charge pump chipset includes at least two charge pump chips on the first circuit board and at least two charge pump chips on the second circuit board connected in parallel. One charge pump chip on the first circuit board and at least one charge pump chip on the second circuit board are controlled to be in a working state at the same time. In response to a temperature of the charge pump chip in the working state on the first circuit board being higher than a threshold, any charge pump chip on the first circuit board with the temperature lower than the threshold is switched to the working state.

15 Claims, 4 Drawing Sheets

(56) References Cited

U.S. PATENT DOCUMENTS

2019/0148800 A1* 5/2019 Toth .................... H01M 10/615
                                                              320/153
2021/0289656 A1* 9/2021 Fan ...................... H05K 1/0203

OTHER PUBLICATIONS

Office Action issued in corresponding Chinese Patent Application No. 202010177274.3 dated Jan. 5, 2023 (with English translation); 27 pages.

* cited by examiner

METHOD AND APPARATUS FOR CONTROLLING CHARGE PUMP CHIPS

CROSS REFERENCE TO RELATED APPLICATION

This application is based on and claims priority to Chinese patent application No. 202010177274.3, filed on Mar. 13, 2020, the entire content of which is hereby incorporated into this application by reference in its entirety.

TECHNICAL FIELD

The present disclosure relates to a field of charging technologies of electronic devices, including a charging control method and apparatus, and a storage medium.

BACKGROUND

Currently, fast charging technology is a popular development trend of electronic devices. The fast charging technology improves charging efficiency, and thus provides more electricity quantity for a battery in a shorter period of time. However, due to excessive charging power of the fast charging technology, serious beat generation of a charge pump chip can exist in the charging process, which can negatively affect a user experience of using the electronic devices.

SUMMARY

The present disclosure provides a charging control method, a charging control apparatus, and a storage medium that improves a user experience of fast charging technology by reducing or preventing heat generated by charge pump chips.

Exemplary embodiments according to a first aspect of the disclosure provide a charging control method. The method is applied to an electronic device including a first circuit board, a second circuit board, and a charge pump chipset. The second circuit board is provided on the first circuit board. The charge pump chipset includes at least two charge pump chips provided on the first circuit board and at least two charge pump chips provided on the second circuit board. The at least two charge pump chips provided on the first circuit board and the at least two charge pump chips provided on the second circuit board are connected in parallel. The method can include controlling one charge pump chip on the first circuit board and at least one charge pump chip on the second circuit board to be in a working state at the same time and, in response to a temperature of the charge pump chip in the working state on the first circuit board being higher than a set threshold, switching any charge pump chip on the first circuit board with the temperature lower than the set threshold to the working state.

Exemplary embodiments according to a second aspect of the present disclosure provide a charging control apparatus. The apparatus is applied to an electronic device including a first circuit board, a second circuit board, and a charge pump chipset. The second circuit board is provided on the first circuit board. The charge pump chipset includes at least two charge pump chips provided on the first circuit board and at least two charge pump chips provided on the second circuit board. The at least two charge pump chips provided on the first circuit board and the at least two charge pump chips provided on the second circuit board are connected in parallel. The apparatus can include a processor and a memory. The memory is configured to store instructions executable by the processor. The processor is configured to execute the instructions stored in the memory to implement operations of controlling one charge pump chip on the first circuit board and at least one charge pump chip on the second circuit board to be in a working state at the same time, and, in response to a temperature of the charge pump chip in the working state on the first circuit board being higher than a set threshold, switching any charge pump chip on the first circuit board with the temperature lower than the set threshold to the working state.

Exemplary embodiments of a third aspect of the present disclosure provide a readable storage medium having executable instructions stored thereon. When the executable instructions are executed by a processor, steps of the method as described in the first aspect can be implemented.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
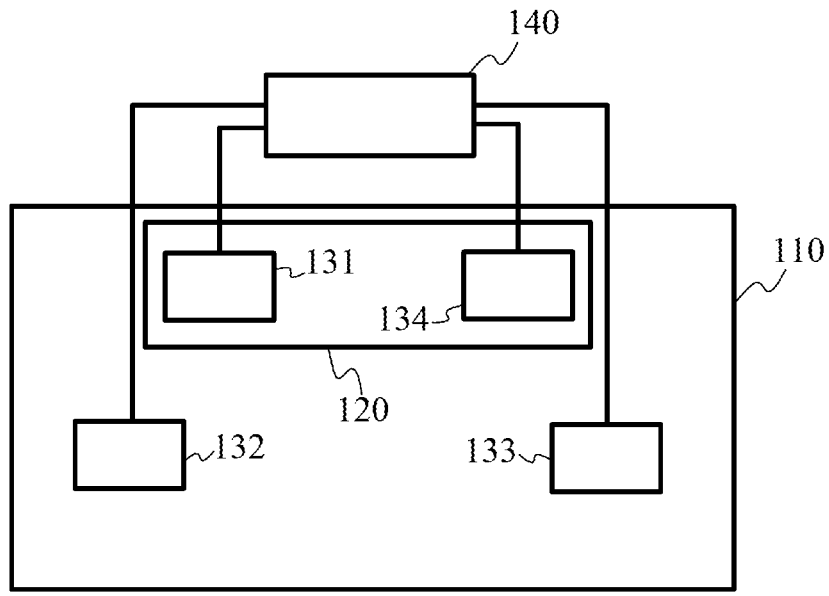
FIG. 1 is a schematic diagram of a charging circuit according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are for the purpose of describing specific embodiments only, and are not intended to limit the present disclosure. Unless otherwise defined, the technical or scientific terms used in the present disclosure shall have usual meanings understood by persons of ordinary skill in the field to which the present disclosure belongs. Words such as "a" and "one" used in the specification and claims do not limit the quantity; rather, they mean at least one. Unless otherwise specified, words such as "comprise" or "include" mean that elements or objects before "comprise" or "include" cover elements or objects listed after "comprise" or "include" and their equivalents, and other components or objects are not excluded. "Connected", "linked" and similar words are not limited to physical or mechanical connections, rather, they may include direct or indirect electrical connections.

The singular forms "a", "said" and "the" used in the present disclosure and attached claims are also intended to include plural forms, unless the context clearly indicates other meanings. It should also be understood that terms "and/or" as used herein refer to and include any or all possible combinations of one or more associated listed items.

A charge pump chip is a converter capable of reducing voltage and increasing current, and is used as one of components of a charging module in an electronic device to achieve fast charging. When the charging power exceeds 100 W, the capacity conversion loss of the charge pump chip is high, resulting in a rapid increase in temperature of the electronic device. The body of the electronic device being hot affects hand feeling of a user.

In addition, when the temperature in the electronic device is excessively high, the charge pump chip is suppressed from generating heat by reducing the charging current. In this manner, a length of time of charging at a large current is shortened, charging speed is slowed down, and the fast charging experience is affected.

The charging control method and apparatus provided by embodiments of the present disclosure may adapt to a charging solution with a charging power of more than 100 W. In addition, the length of time of charging at the large current may be extended in a charge only state and a screen-on charging state, and heat generated by charge pump chips may be effectively suppressed, thereby optimizing the user experience.

Before introducing the charging control method provided by embodiments of the present disclosure, the charging circuit applicable to the charging control method is first described. FIG. 1 is a schematic diagram of a charging circuit according to an exemplary embodiment. As illustrated in FIG. 1, the charging circuit includes a first circuit board 110, a second circuit board 120, a charge pump chipset, and a control component 140.

The second circuit board 120 is provided on the first circuit board 110. The charge pump chip set includes at least two charge pump chips provided on the first circuit board 110 and at least two charge pump chips provided on the second circuit board 120. FIG. 1 is an example in which two charge pump chips (131, 134) are provided on the first circuit board 120, and two charge pump chips (132, 133) are provided on the second circuit board 120. The charge pump chips on the first circuit board 110 and the charge pump chips on the second circuit board 120 are arranged in parallel.

In this manner, current distribution is realized by a plurality of charge pump chips connected in parallel, which is beneficial to reduce heat generated by each charge pump chip. In addition, the charge pump chips on the second circuit board 120 and the charge pump chips on the first circuit board 110 form relatively isolated heat sources, avoiding a local high temperature of the electronic device resulted from concentrated heat generation of the charge pump chips.

The control component 140 is connected to the charge pump chips provided on the first circuit board 110 and the second circuit board 120 to control the charge pump chips to be turned on or off. Optionally, the control component 140 includes a processor and a temperature detection component. The temperature detection component is configured to detect temperatures of the charge pump chips on the first circuit board 110 and the second circuit board 120. The processor is configured to control the charge pump chips on the first circuit board 110 and the second circuit board 120 to be turned on or off based on temperatures of the charge pump chips detected by the temperature detection component.

Figure 2:
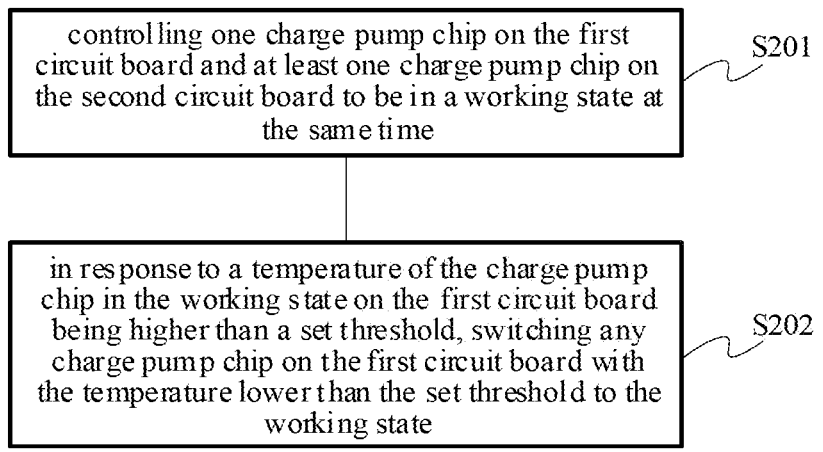
FIG. 2 is a flowchart of a charging control method according to an exemplary embodiment.

FIG. 2 is a flowchart of a charging control method according to an exemplary embodiment. The method is implemented based on the charging circuit provided above. In addition, the charging control method provided by embodiments of the present disclosure is applicable to the charge only state and the screen-on charging state of the electronic device. The charge only state refers to a pure charging state of the electronic device. In the charge only state, functional modules of the electronic device except the charging module are in a disabled state. The screen-on charging state means that the electronic device is charged in a working state, and the functional modules of the electronic device except the charging module are also in an enabled state.

As illustrated in FIG. 2, the charging control method according to the embodiment of the present disclosure includes the following. At block S201, one charge pump chip on the first circuit board and at least one charge pump chip on the second circuit board are controlled to be in a working state simultaneously or at the same time.

The charge pump chips on the first circuit board and the second circuit board form two relatively isolated heat sources in an enabled state, and the second circuit board is closer to a rear cover or middle bezel of the electronic device than the first circuit board. That is, heat dissipation condition of the second circuit board is better than that of the first circuit board. Therefore, through a combination of the one charge pump chip on the first circuit board and the at least one charge pump chip on the second circuit board, at least two relatively isolated heat sources are formed in the body of the electronic device. In addition, with the advantage of the good heat dissipation condition of the second circuit board, a local temperature rise in the body of the electronic device is slowed down.

During the charging process, specific implementations of step S201 in the charge only state and the screen-on charging state are different, which will be explained in the following with reference to different situations. In the charge only state, step S201 includes controlling one charge pump chip on the first circuit board and one charge pump chip on the second circuit board to be in the working state at the same time. In the charge only state, modules (such as a display screen module, a radio frequency module, most of the circuits of the CPU, and the like) with high energy consumption in the electronic device are in a disabled state. At this time, a power supply output of a power supply of the electronic device is negligible. Therefore, using two charge pump chips in the working state meets charging requirements. Optionally, in the charge only state, in order to ensure the charging speed, a maximum charging current outputted by the two simultaneously enabled charge pump chips is 10 A.

In an embodiment, with continued reference to FIG. 1, the two charge pump chips (131, 134) are provided on the first circuit board 110, and the two charge pump chips (132, 133) are provided on the second circuit board 120. The charge pump chips on the first circuit board 110 and the second circuit board 120 are located at four vertexes of a quadrilateral, respectively. In step S201, two charge pump chips located on the same diagonal of the quadrilateral are in the working state at the same time. For example, the charge pump chip 131 and the charge pump chip 133 are in the working state at the same time, and the charge pump chip 132 and the charge pump chip 134 are in the working state at the same time.

In the charge only state, the charge pump chips in the working state are main heat sources in the body of the electronic device. Therefore, when the two charge pump chips located on the same diagonal line work at the same time, the two charge pump chips form two dispersed heat sources, avoiding the local high temperature in the electronic device.

In the screen-on charging state, step S201 specifically includes controlling one charge pump chip on the first circuit board and at least two charge pump chips on the second circuit board to be in the working state at the same time. In the screen-on charging state, the electronic device is in a normal use state, and modules such as the radio frequency module and the display screen module are in the working state. At this time, while the battery of the electronic device receives a charging current outputted by the charge pump chips, the battery also outputs a supply current to other enabled functional modules. In the screen-on charging state, in order to ensure the service life of the battery, the maximum charging current outputted by the charge pump chips in the working state is 5 A.

In addition, since there are many heat sources inside the electronic device in the screen-on charging state, a relatively low charging current is used to take into account the heat dissipation capacity of the electronic device itself, thereby avoiding the situation that the charging current must be reduced as temperatures of the charge pump chips rise too fast.

In the screen-on charging state, at least three charge pump chips are switched to the working state at the same time to share the current and to reduce the heat generated by each charge pump chip. In addition, considering that the heat dissipation condition of the second circuit board is better, preferably, the charge pump chips on the second circuit board are switched to the working state. Optionally, when two charge pump chips are provided on the second circuit board, in the screen-on charging state, both the two charge pump chips on the second circuit board are controlled to be in the working state.

With continued reference to FIG. 2, after step S201, the method further includes the following.

At block S202, in response to a temperature of a charge pump chip in the working state on the first circuit board being higher than a set threshold, any charge pump chip on the first circuit board with the temperature lower than the set threshold is switched to the working state. Optionally, the charge pump chip with the lowest temperature on the first circuit board is switched to the working state. In this case, the charge pump chip with the lowest temperature on the first circuit board that is not in the working state is determined based on temperatures of charge pump chips detected by the temperature detection component.

As the working time is extended, the temperature of the charge pump chip in the working state will gradually increase. When the temperature of the charge pump chip in the working state reaches the set threshold, the charge pump chip with the temperature lower than the set threshold is switched to work. In this manner, dynamically distributed heat sources are formed inside the electronic device. With the charge pump chips that work in turn, the local temperature inside the electronic device being too high is avoided, the length of time for the charge pump chips to charge the battery with a large charging current is prolonged, and the charging speed is increased.

Specific implementations of step S202 in the charge only state and the screen-on charging state are different, which will be explained in the following with reference to different situations. In the charge only state, step S202 includes, in response to the temperature of each of the charge pump chip in the working state on the first circuit board and the at least one charge pump chip in the working state on the second circuit board being higher than the set threshold (which may be set as 38° C. in the charge only state), switching any charge pump chip on the first circuit board with the temperature lower than the set threshold and any charge pump chip on the second circuit board with the temperature lower than the set threshold to the working state.

Taking the situation illustrated in FIG. 1 as an example, the charge pump chips (131, 134) on the first circuit board 110 and the charge pump chips (132, 133) on the second circuit board 120 are located at four vertexes of a quadrangle. In step S201, the charge pump chip 131 and the charge pump chip 133 work at the same time. In step S202, in response to temperature of each of the charge pump chip 131 and the charge pump chip 133 is higher than the set threshold, the charge pump chip 131 and the charge pump chip 133 are turned off, and the charge pump chip 132 and the charge pump chip 134 are switched to the working state.

In the charge only state, the heat generated by other functional modules is very low, and the charge pump chips in the working state are the main heat sources. At this time, the heat dissipation capacity of the whole electronic device is good. In view of the good heat dissipation condition, even if the temperature of one of the two charge pump chips in the working state is higher than the set threshold of the charge only state, it is impossible that the local temperature of the electronic device is too high. Therefore, the temperature of each of the two charge pump chips in the working state being higher than the set threshold of the charge only state is determined as a trigger condition for switching the charge pump chips. In this manner, under the premise of improving the hand feeling of the user, the length of time of charging the charge pump chips with the large current is further prolonged, and the charging speed is increased.

In the screen-on charging state, step S202 includes, in response to the temperature of the charge pump chip in the working state on the first circuit board being higher than the set threshold (which may be set as 39° C. in the screen-on charging state), switching any charge pump chip on the first circuit board with the temperature lower than the set threshold to the working state, and keeping the at least two charge pump chips on the second circuit board in the working state.

Taking the situation illustrated in FIG. 1 as an example, two charge pump chips are provided on the first circuit board 110 and two charge pumps are provided on the second circuit board 120. In step S201, the charge pump chip 131 and the charge pump chips 132, 133 are in the working state at the same time. In step S202, in response to the temperature of the charge pump chip 131 being higher than the set threshold of the screen-on charging state, the charge pump chip 131 is turned off, and the charge pump chip 134 and the charge pump chips 132, 133 are switched to the working state at the same time.

In the screen-on charging state, at least three charge pump chips are in the working state at the same time, and the charging current is weaker than the charging current in the charge only state. Therefore, the two charge pump chips on the second circuit board generate little heat. For example, the charging current is 5 A in the screen-on charging state. When three charge pump chips work at the same time, the current shared by each charge pump chip on the second circuit board is 1.66 A, and thus it is difficult for the temperature of the charge pump chip to increase to the set threshold of the screen-on charging state. In addition, since the first circuit board has other heat sources (functional modules on the first circuit board), the temperature of the charge pump chip on the first circuit board rises quickly.

Based on the above, in the screen-on charging state, the temperature of the charge pump chip on the first circuit board being higher than the set threshold is determined as the trigger condition for switching the charge pump chip. In addition, the set threshold of the screen-on charging state is higher than the set threshold of the charge only state. In the screen-on charging state, temperatures of the charge pump chips rise relatively quickly due to several heat sources on the first circuit board. Therefore, the set threshold of the screen-on charging state is higher than the set threshold of the charge only state, so as to ensure that there is a reasonable climbing space for the temperature of the charge pump chip on the first circuit board in the screen-on charging state, avoiding frequent switches of the charge pump chips.

In summary, the charging control method provided by embodiments of the present disclosure controls different charge pump chips on the first circuit board and the second circuit board to work at different periods of time based on the temperatures of the charge pump chips. In this manner, on the one hand, the length of time for the charge pump chipset to charge the power supply with a large current is prolonged, and the charging speed of fast charging is increased. On the other hand, dynamically distributed heat sources are formed during the charging process to effectively control the heat generation of the charge pump chips and to optimize the user experience.

In addition, it should also be noted that, in step S201, the charge pump chip with the lowest temperature on the first circuit board is controlled as the charge pump chip used for the first time. In this manner, the charge pump chip with the lowest temperature has the largest climbing space for the temperature to rise to the set threshold in step S202, which ensures that the charge pump chip has a long continuous working time, avoids frequent switches, and increases the charging speed.

As the charging proceeds, the heat inside the electronic device gradually accumulates, and the temperatures of the charge pump chips also gradually increase. In an implementation of the present disclosure, when the temperature of each of at least two charge pump chips on the first circuit board is higher than the set threshold, the charging current outputted by the charge pump chips is lowered to reduce the heat generation of the charge pump chips and to protect the battery.

In detail, in the charge only state, in response to the temperatures of each of the at least two charge pump chips on the first circuit board and the at least two charge pump chips on the second circuit board being higher than the set threshold, the charging current outputted by the charge pump chips in the working state is reduced. In the screen-on charging state, in response to the temperature of each of the at least two charge pump chips on the first circuit board being higher than the set threshold of the screen-on charging state, the charging current outputted by the charge pump chips in the working state is reduced.

There is no specific limit to a reduction extent of the charging current.

Illustratively, the screen-on charging state is taken as an example. When the temperature of each of the at least two charge pump chips on the first circuit board is higher than the set threshold, the charging current is directly reduced to a safe current (for example, 2 A). In this manner, the heat dissipation effect is optimized and the safety of charging is guaranteed.

The above example only uses the screen-on charging state as an example for description, rather than as a limitation that the example method of reducing the charging current is only applicable to the screen-on charging state.

Illustratively, the electronic device being in the charge only state is taken as an example. The set threshold includes a first threshold and a second threshold. In response to the temperature of each of the charge pump chips on the first circuit board and the second circuit board being higher than the first threshold (for example, 38° C.), the charging current is controlled to be reduced to a first charging current (for example, to be reduced from 10 A to 7 A). In response to the temperature of each of the charge pump chips on the first circuit board and the second circuit board being higher than the second threshold (for example, 40° C.), the charging current is controlled to be reduced to a second charging current (for example, to be reduced from 7 A to 5 A).

The above example only uses the charge only state as an example for description, rather than as a limitation that the example method of reducing the charging current is only applicable to the charge only state.

Figure 3:
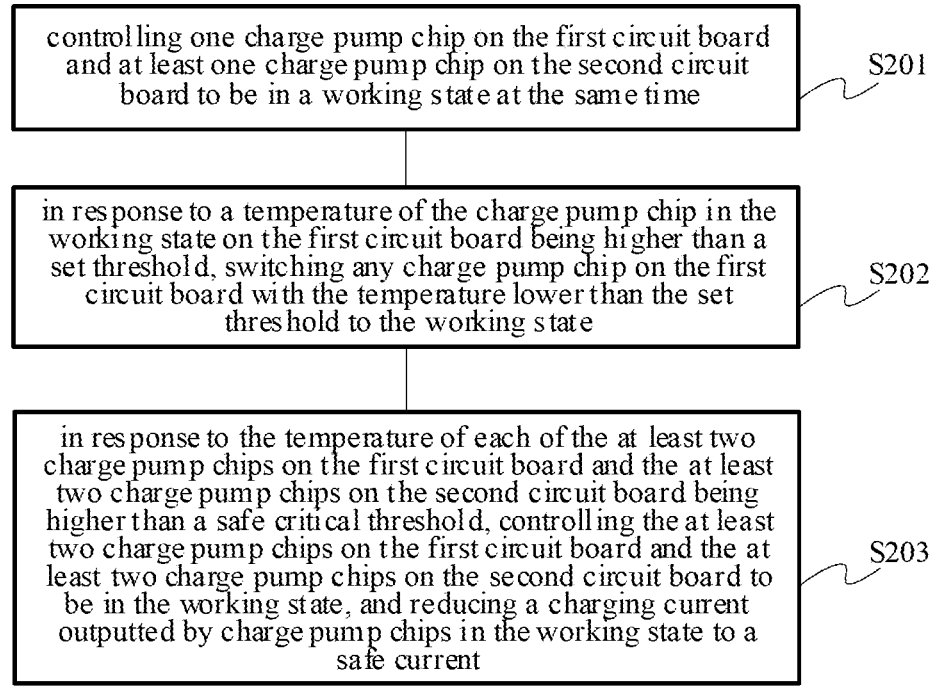
FIG. 3 is a flowchart of a charging control method according to another exemplary embodiment.

FIG. 3 is a flowchart of a charging control method according to another exemplary embodiment. In an embodiment, as illustrated in FIG. 3, after step S201 and step S202, as charging proceeds, the method further includes the following.

At block S203, in response to the temperature of each of the at least two charge pump chips on the first circuit board and the at least two charge pump chips on the second circuit board being higher than a safe critical threshold, all the at least two charge pump chips on the first circuit board and the at least two charge pump chips on the second circuit board are controlled to be in the working state, and a charging current output by charge pump chips in the working state is reduced to a safe current.

In such a situation, the charge pump chips are in an emergency state. At this time, reducing the heat generation of the charge pump chips is a priority goal. Therefore, by increasing the number of the charge pump chips in the working state, the current shared by each charge pump chip is reduced. In addition, the safe current (for example, 2 A) is used as the charging current to further reduce the heat generation of each charge pump chip. In this manner, the temperature of the body of the electronic device is prevented from increasing, avoiding affecting the user experience.

Figure 4:
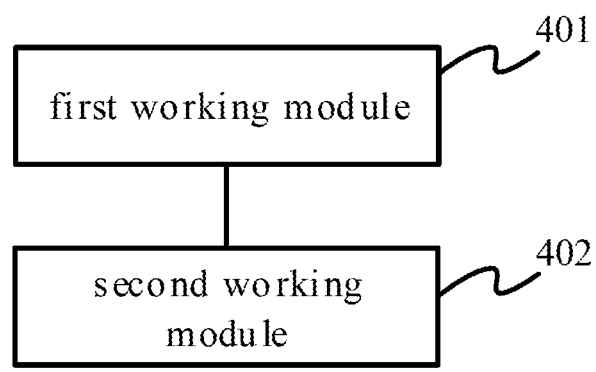
FIG. 4 is a block diagram of a charging control apparatus according to an exemplary embodiment.

Based on the above charging control method, embodiments of the present disclosure further provide a charging control apparatus. FIG. 4 is a block diagram of a charging control apparatus according to an exemplary embodiment. As illustrated in FIG. 4, the charging control apparatus includes a first working module 401 and a second working module 402.

The first working module 401 is configured to control one charge pump chip on the first circuit board and at least one charge pump chip on the second circuit board to be in a working state at the same time.

The second working module 402 is configured to, in response to a temperature of a charge pump chip in the working state on the first circuit board being higher than a set threshold, control any charge pump chip on the first circuit board with the temperature lower than the set threshold to be in the working state.

In an embodiment, when the electronic device is in a charge only state, the first working module 401 is configured to control one charge pump chip on the first circuit board and one charge pump chip on the second circuit board to be in the working state at the same time. In an embodiment, in the charge only state, the second working module 402 is configured to, in response to the temperature of each of the charge pump chip in the working state on the first circuit board and the at least one charge pump chip in the working state on the second circuit board being higher than the set threshold, switch any charge pump chip on the first circuit board with the temperature lower than the set threshold and any charge pump chip on the second circuit board with the temperature lower than the set threshold to the working state.

Figure 5:
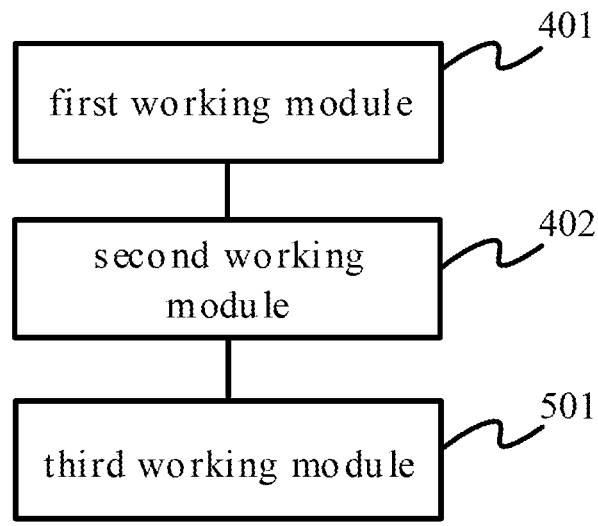
FIG. 5 is a block diagram of a charging control apparatus according to another exemplary embodiment.

FIG. 5 is a block diagram of a charging control apparatus according to another exemplary embodiment. As illustrated in FIG. 5, the charging control apparatus further includes a third working module 501. The third working module 501 is configured to, in response to the temperature of each of the at least two charge pump chips on the first circuit board and the at least two charge pump chips on the second circuit board being higher than the set threshold, reduce a charging current outputted by the charge pump chips in the working state.

In an embodiment, two charge pump chips are provided on the first circuit board, and two charge pump chips are provided on the second circuit board. The charge pump chips on the first circuit board and the second circuit board are respectively located at four vertices of a quadrilateral. Two charge pump chips located on a same diagonal of the quadrilateral are in the working state at the same time.

In an embodiment, when the electronic device is in a screen-on charging state, the first working module 401 is configured to control one charge pump chip on the first circuit board and at least two charge pump chips on the second circuit board to be in the working state at the same time.

In an embodiment, in the screen-on charging state, the second working module 402 is configured to, in response to the temperature of the charge pump chip in the working state on the first circuit board being higher than the set threshold, switch any charge pump chip on the first circuit board with the temperature lower than the set threshold to the working state, and keep the at least two charge pump chips on the second circuit board in the working state.

Figure 6:
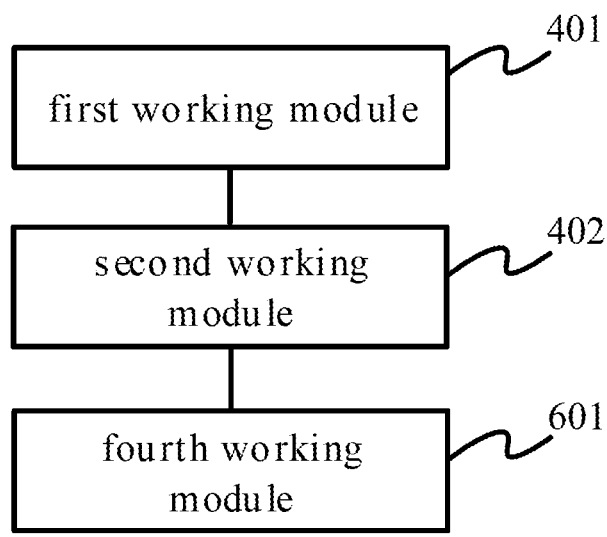
FIG. 6 is a block diagram of a charging control apparatus according to yet another exemplary embodiment.

FIG. 6 is a block diagram of a charging control apparatus according to yet another exemplary embodiment. As illustrated in FIG. 6, the charging control apparatus further includes a fourth working module 601. The fourth working module 601 is configured to, in response to the temperature of each of the at least two charge pump chips on the first circuit board being higher than the set threshold, reduce the charging current outputted by the charge pump chips in the working state.

Figure 7:
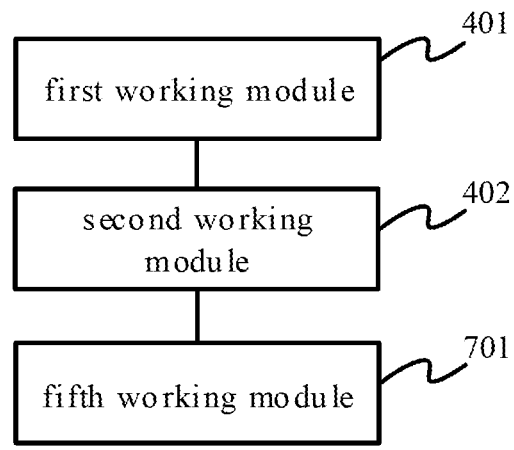
FIG. 7 is a block diagram of a charging control apparatus according to still yet another exemplary embodiment.

FIG. 7 is a block diagram of a charging control apparatus according to still yet another exemplary embodiment. As illustrated in FIG. 7, in an embodiment, the apparatus further includes a fifth working module 701. The fifth working module 701 is configured to, in response to the temperature of each of the at least two charge pump chips on the first circuit board and the at least two charge pump chips on the second circuit board being higher than a safe critical threshold, control the at least two charge pump chips on the first circuit board and the at least two charge pump chips on the second circuit board to be in the working state, and reduce the charging current outputted by the charge pump chips in the working state to a safe current.

Figure 8:
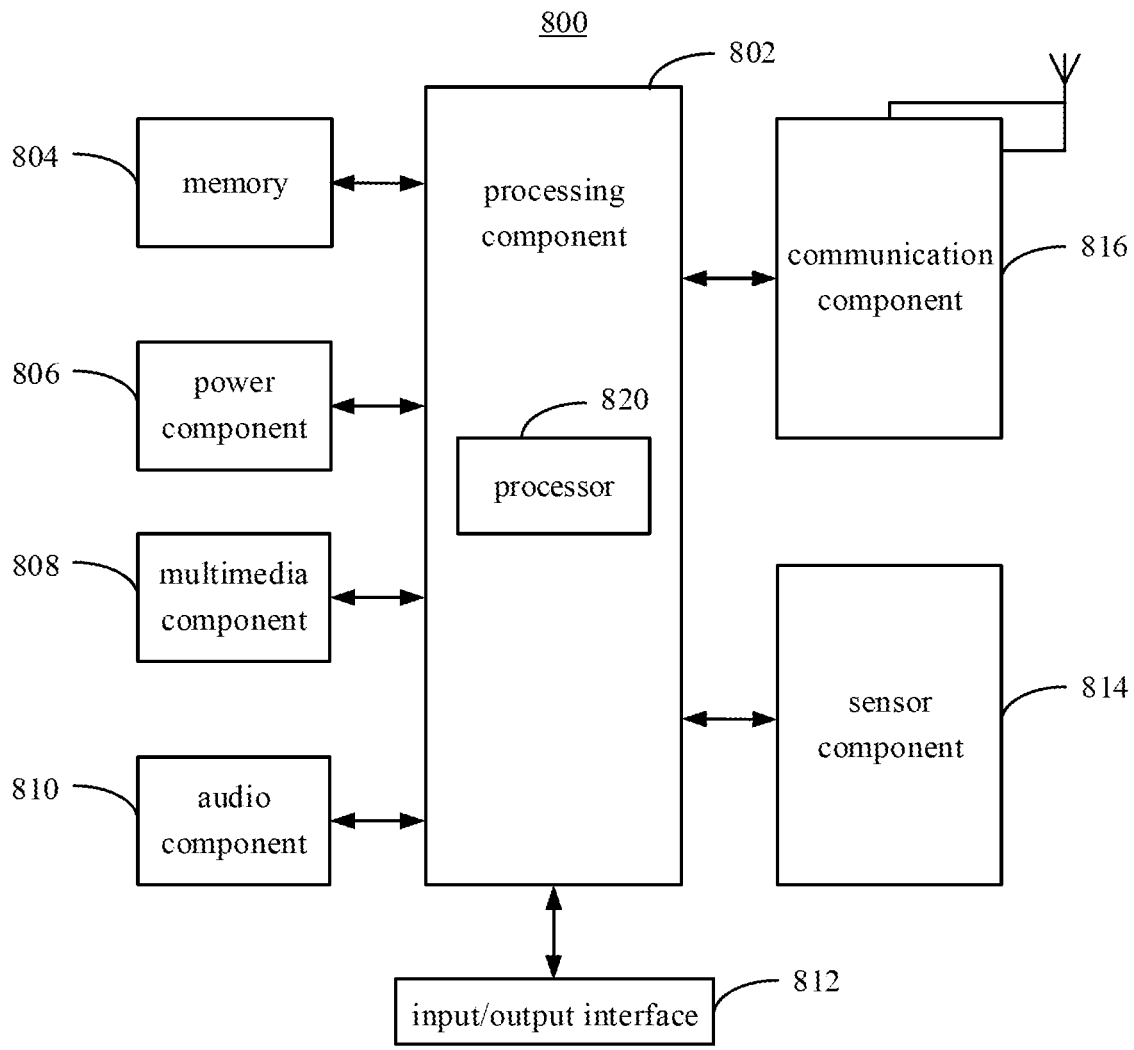
FIG. 8 is a block diagram of an electronic device according to an exemplary embodiment.

Embodiments of the present disclosure provide an electronic device. The electronic device may apply the power management method and the charge pump chip control method according to the above embodiments. FIG. 8 is a block diagram of an electronic device 800 according to an exemplary embodiment. As illustrated in FIG. 8, the electronic device 800 may include one or more of the following components: a processing component 802, a memory 804, a power component 806, a multimedia component 808, an audio component 810, an input/output (I/O) interface 812, a sensor component 814, a communication component 816, and an image collection component.

The processing component 802 normally controls the overall operation (such as operations associated with displaying, telephone calls, data communications, camera operations and recording operations) of the electronic device 800. The processing component 802 may include one or a plurality of processors 820 to execute instructions. In addition, the processing component 802 may include one or a plurality of units to facilitate interactions between the processing component 802 and other components. For example, the processing component 802 may include a multimedia unit to facilitate interactions between the multimedia component 808 and the processing component 802.

The memory 804 is configured to store various types of data to support operations at the electronic device 800. Examples of such data include instructions for any application or method operated on the electronic device 800, contact data, phone book data, messages, images, videos and the like. The memory 804 may be realized by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 806 provides power to various components of the electronic device 800. The power component 806 may include a power management system, one or a plurality of power sources and other components associated with power generation, management, and distribution of the electronic device 800.

The multimedia component 808 includes a screen that provides an output interface between the electronic device 800 and a target object. In some embodiments, the screen may include a liquid crystal display (LCD) and a touch panel (TP). If the screen includes a touch panel, the screen may be implemented as a touch screen to receive input signals from the user. The touch panel includes one or a plurality of touch sensors to sense touches, slides, and gestures on the touch panel. The touch sensor may sense not only the boundary of the touches or sliding actions, but also the duration and pressure related to the touches or sliding operations.

The audio component 810 is configured to output and/or input an audio signal. For example, the audio component 810 includes a microphone (MIC) that is configured to receive an external audio signal when the electronic device 800 is in an operation mode such as a call mode, a recording mode, and a voice recognition mode. The received audio signal may be further stored in the memory 804 or transmitted via the communication component 816. In some embodiments, the audio component 810 further includes a speaker for outputting audio signals.

The I/O interface 812 provides an interface between the processing component 802 and a peripheral interface unit. The peripheral interface unit may be a keyboard, a click wheel, a button, and the like.

The sensor assembly 814 includes one or a plurality of sensors for providing the electronic device 800 with various aspects of status assessments. For example, the sensor component 814 may detect an open/closed state of the electronic device 800 and a relative positioning of the components. For example, the components may be a display and a keypad of the electronic device 800. The sensor component 814 may also detect a change in position of the electronic device 800 or a component of the electronic device 800, the presence or absence of contact of the target object with the electronic device 800, the orientation or acceleration/deceleration of the electronic device 800 and a temperature change of the electronic device 800.

The communication component 816 is configured to facilitate wired or wireless communication between the electronic device 800 and other devices. The electronic device 800 may access a wireless network based on a communication standard such as Wi-Fi, 2G or 3G, or a combination thereof. In an exemplary embodiment, the communication component 816 receives broadcast signals or broadcast-associated information from an external broadcast management system via a broadcast channel. In an exemplary embodiment, the communication component 816 further includes a near field communication (NFC) module to facilitate short range communication. For example, in the NFC module, short range communication may be implemented based on radio frequency identification (RFID) technology, infrared data association (IrDA) technology, ultra-wideband (UWB) technology, Bluetooth (BT) technology and other technologies.

In an exemplary embodiment, the electronic device 800 may be implemented by one or a plurality of application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components.

In an exemplary embodiment, there is also provided a readable storage medium having an executable instruction stored thereon. The executable instruction is executable by the processor of the electronic device to implement steps of the battery management method and the charge pump chip control method as described above. For example, the readable storage medium may be a ROM, a random access memory (RAM), a CD-ROM, a magnetic tape, a floppy disk, an optical data storage device, and the like.

Other implementations of the present disclosure will be apparent to those skilled in the art after considering the specification and practicing the present disclosure disclosed herein. The present disclosure is intended to cover any variations, uses or adaptive changes of the present disclosure, which are in accordance with general principles of the present disclosure and include common knowledge or technical means in the art that are not disclosed herein. The specification and embodiments are to be regarded as illustrative only, and the real scope and spirit of the present disclosure are pointed out in the attached claims.

What is claimed is:

1. A charging control method that is applied to an electronic device having a first circuit board, a second circuit board that is provided on the first circuit board, and a charge pump chipset having at least two charge pump chips provided on the first circuit board that are connected in parallel with at least two charge pump chips provided on the second circuit board, the charging control method comprising:
controlling one charge pump chip on the first circuit board and at least one charge pump chip on the second circuit board to simultaneously be in a working state; and
in response to a temperature of the charge pump chip in the working state on the first circuit board being higher than a set threshold, switching any charge pump chip on the first circuit board with a temperature lower than the set threshold to the working state;
wherein controlling one charge pump chip on the first circuit board and at least one charge pump chip on the second circuit board to simultaneously be in the working state comprises:
when the electronic device is in a charge only state, controlling one charge pump chip on the first circuit board and one charge pump chip on the second circuit board to simultaneously be in the working state;
when the electronic device is in a screen-on charging state, controlling the one charge pump chip on the first circuit board to simultaneously be in the working state with the at least two charge pump chips on the second circuit board.

2. The method of claim 1, wherein switching any charge pump chip on the first circuit board with the temperature lower than the set threshold to the working state when the temperature of the charge pump chip in the working state on the first circuit board is higher than the set threshold, further comprises:
switching any charge pump chip on the first circuit board with a temperature lower than the set threshold and any charge pump chip on the second circuit board with the temperature lower than the set threshold to the working state when a temperature of each of the charge pump chip in the working state on the first circuit board and the at least one charge pump chip in the working state on the second circuit board are higher than the set threshold.

3. The method of claim 1, further comprising:
reducing a charging current output by the charge pump chips in the working state when temperatures of each of the at least two charge pump chips on the first circuit board and the at least two charge pump chips on the second circuit board are higher than the set threshold.

4. The method of claim 1, wherein two charge pump chips are provided on the first circuit board and two charge pump chips are provided on the second circuit board, the charge pump chips on the first circuit board and the second circuit board are respectively located at four vertices of a quadrilateral, and controlling one charge pump chip on the first circuit board and at least one charge pump chip on the second circuit board to simultaneously be in a working state, further comprises:
controlling two charge pump chips located on a same diagonal of the quadrilateral to simultaneously be in the working state.

5. The method of claim 1, wherein switching any charge pump chip on the first circuit board with the temperature lower than the set threshold to the working state when the temperature of the charge pump chip in the working state on the first circuit board is higher than the set threshold, further comprises:
switching any charge pump chip on the first circuit board with a temperature lower than the set threshold to the working state, and keeping the at least two charge pump chips on the second circuit board in the working state when a temperature of the charge pump chip in the working state on the first circuit board is higher than the set threshold.

6. The method of claim 1, further comprising:
reducing the charging currents outputted by the charge pump chips in the working state when the temperature of each of the at least two charge pump chips on the first circuit board is higher than the set threshold.

7. The method of claim 1, further comprising:
controlling the at least two charge pump chips on the first circuit board and the at least two charge pump chips on the second circuit board to be in the working state and reducing the charging current outputted by the charge pump chips in the working state to a safe current when temperatures of each of the at least two charge pump chips on the first circuit board and the at least two charge pump chips on the second circuit board exceed a safe critical threshold.

8. A charging control apparatus that is applied to an electronic device that includes a first circuit board, a second circuit board that is provided on the first circuit board, and a charge pump chipset having at least two charge pump chips provided on the first circuit board that are connected in parallel with at least two charge pump chips provided on the second circuit board, the charging control apparatus comprising:
a processor; and
a memory that is configured to store instructions executable by the processor,
wherein the processor is configured to execute the instructions stored in the memory to implement operations of:
controlling one charge pump chip on the first circuit board and at least one charge pump chip on the second circuit board to simultaneously be in a working state; and
in response to a temperature of the charge pump chip in the working state on the first circuit board being higher than a set threshold, switching any charge pump chip on the first circuit board with a temperature lower than the set threshold to the working state;
wherein the processor is further configured to:
when the electronic device is in a charge only state, control one charge pump chip on the first circuit board and one charge pump chip on the second circuit board to simultaneously be in the working state;
when the electronic device is in a screen-on charging state, control the one charge pump chip on the first circuit board to simultaneously be in the working state with the at least two charge pump chips on the second circuit board.

9. The apparatus of claim 8, wherein the processor is configured to:
switch any charge pump chip on the first circuit board with a temperature lower than the set threshold and any charge pump chip on the second circuit board with a temperature lower than the set threshold to the working state when the temperature of each of the charge pump chip in the working state on the first circuit board and the at least one charge pump chip in the working state on the second circuit board is higher than the set threshold of the charge only state.

10. The apparatus of claim 8, wherein the processor is further configured to:
reduce a charging current outputted by the charge pump chips in the working state when a temperature of each of the at least two charge pump chips on the first circuit board and the at least two charge pump chips on the second circuit board is higher than the set threshold.

11. The apparatus of claim 8, wherein two charge pump chips are provided on the first circuit board and two charge pump chips are provided on the second circuit board, the charge pump chips on the first circuit board and the second circuit board are respectively located at four vertices of a quadrilateral, and the processor is configured to control two charge pump chips located on a same diagonal of the quadrilateral to simultaneously be in the working state.

12. The apparatus of claim 8, wherein the processor is configured to:
switch any charge pump chip on the first circuit board with a temperature lower than the set threshold to the working state and keep the at least two charge pump chips on the second circuit board in the working state when the temperature of the charge pump chip in the working state on the first circuit board is higher than the set threshold.

13. The apparatus of claim 8, wherein the processor is further configured to:
reduce a charging current outputted by the charge pump chips in the working state when the temperature of each of the at least two charge pump chips on the first circuit board is higher than the set threshold.

14. The apparatus of claim 8, wherein the processor is further configured to:
control the at least two charge pump chips on the first circuit board and the at least two charge pump chips on the second circuit board to be in the working state and reduce a charging current outputted by the charge pump chips in the working state to a safe current when a temperature of each of the at least two charge pump chips on the first circuit board and the at least two charge pump chips on the second circuit board exceeds a safe critical threshold.

15. A non-transitory computer-readable storage medium having executable instructions stored thereon, wherein when the executable instructions are executed by a processor of an electronic device, a charging control method is implemented, the charging control method comprising:
controlling one charge pump chip on a first circuit board and at least one charge pump chip on a second circuit board to simultaneously be in a working state; and
in response to a temperature of the charge pump chip in the working state on the first circuit board being higher than a set threshold, switching any charge pump chip on the first circuit board with a temperature lower than the set threshold to the working state;
wherein controlling one charge pump chip on the first circuit board and at least one charge pump chip on the second circuit board to simultaneously be in the working state comprises:
when the electronic device is in a charge only state, controlling one charge pump chip on the first circuit board and one charge pump chip on the second circuit board to simultaneously be in the working state;
when the electronic device is in a screen-on charging state, controlling the one charge pump chip on the first circuit board to simultaneously be in the working state with the at least two charge pump chips on the second circuit board.

\* \* \* \* \*